Dec. 11, 1962

W. G. LAMOREAUX 3,068,380

MAGNETIC CORE TESTING DEVICE

Filed June 1, 1959

3 Sheets-Sheet 1

INVENTOR
WILLIAM G. LAMOREAUX,

BY *Thomas & Crickenberger*

ATTORNEYS

Dec. 11, 1962 W. G. LAMOREAUX 3,068,380
MAGNETIC CORE TESTING DEVICE
Filed June 1, 1959 3 Sheets-Sheet 2

INVENTOR
WILLIAM G. LAMOREAUX,
BY Thomas & Crickenberger
ATTORNEYS

Dec. 11, 1962    W. G. LAMOREAUX    3,068,380
MAGNETIC CORE TESTING DEVICE
Filed June 1, 1959    3 Sheets-Sheet 3
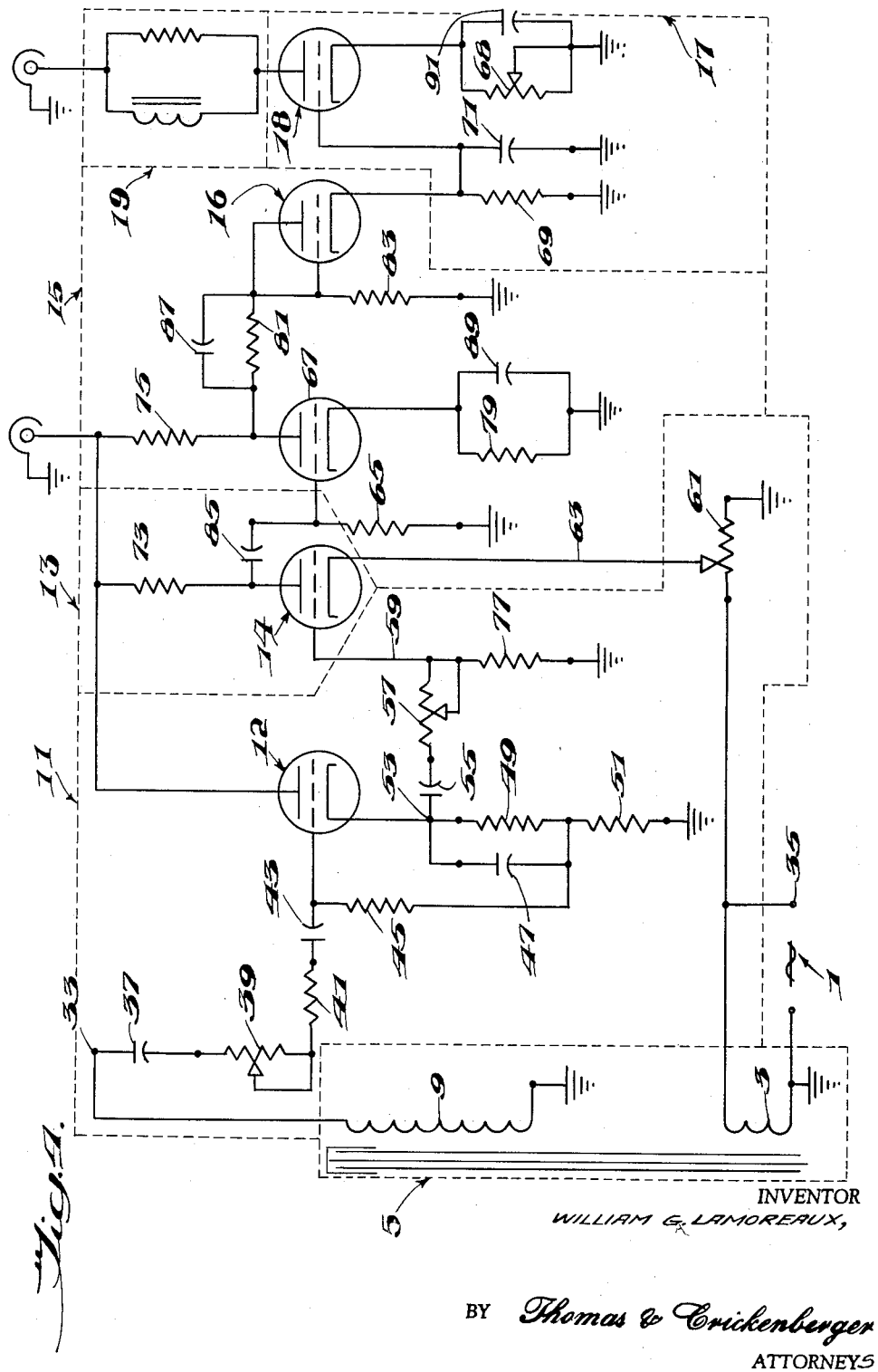
INVENTOR
WILLIAM G. LAMOREAUX,
BY Thomas & Crickenberger
ATTORNEYS

3,068,380
MAGNETIC CORE TESTING DEVICE
William G. Lamoreaux, Vestal, N.Y., assignor to International Business Machines Corporation, New York, N.Y., a corporation of New York
Filed June 1, 1959, Ser. No. 817,304
10 Claims. (Cl. 317—149)

This invention relates to a magnetic core testing device, and more particularly to a magnetic core testing device which automatically detects axial flaws in magnetic core materials.

In the manufacture of magnetic cores having a closed magnetic loop configuration it is desirable to check the continuity of the loop to determine the presence of any axial flaws which may exist. The presently available physical methods of detecting these flaws, such as the Rockwell hardness test, destroy either the physical or the magnetic properties of the cores and, because of this, are unsatisfactory. The device of the present invention tests magnetic cores for the presence of axial flaws by effectively measuring the magnetic loop resistance, and in so doing disturbs neither the physical nor the magnetic properties.

According to a preferred embodiment of the invention, the magnetic core specimen under test is placed in the magnetic flux path between the primary and secondary coils of a detection transformer. The primary coil is energized by a suitable audio frequency source, and the audio signal output from the secondary coil is then compared with the audio frequency source in an amplitude comparison device to detect any difference in amplitude between the two signals. The amplitude comparison device is calibrated initially with a standard magnetic core to have inputs of equal amplitude and identical phase. The magnitude of the output of the amplitude comparison device is then a measure of the amplitude differential between the two signals. When a test core is inserted in the detection transformer, the output is used to energize an appropriate core reject mechanism for eliminating defective cores if a certain predetermined output level is exceeded.

Figure 1:
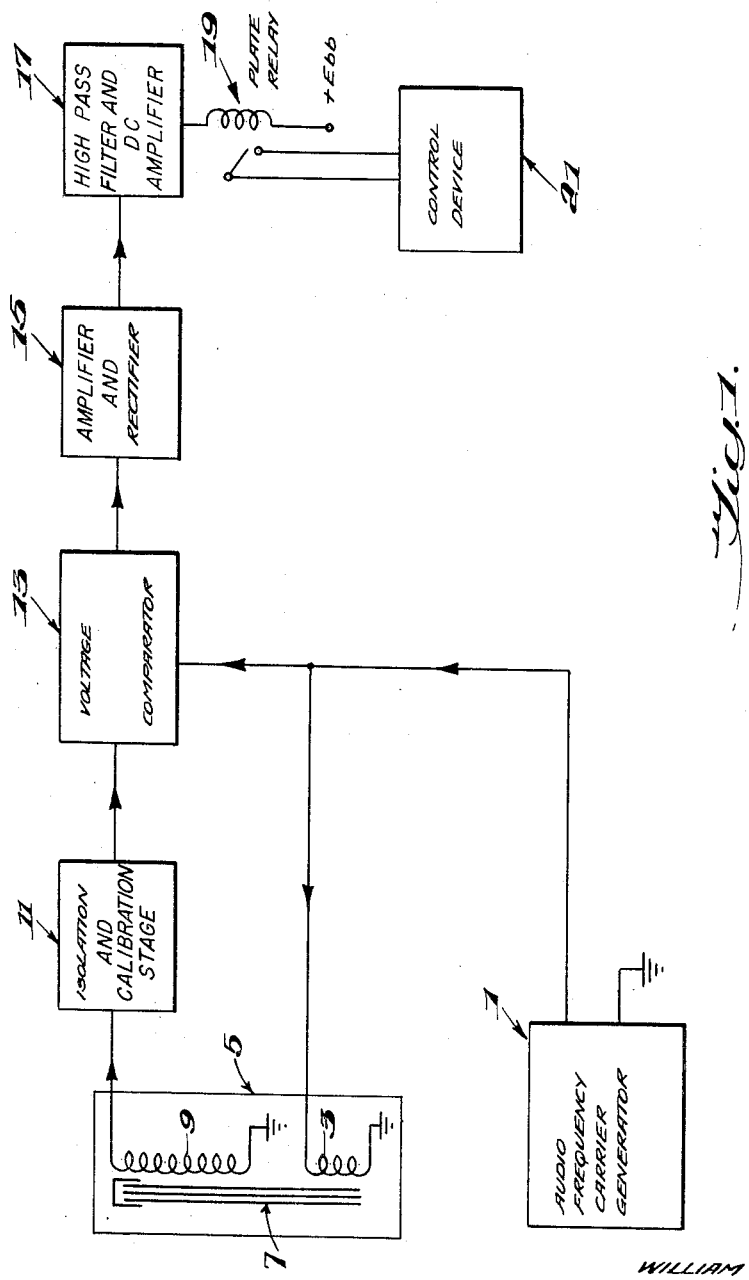
Figure 2:
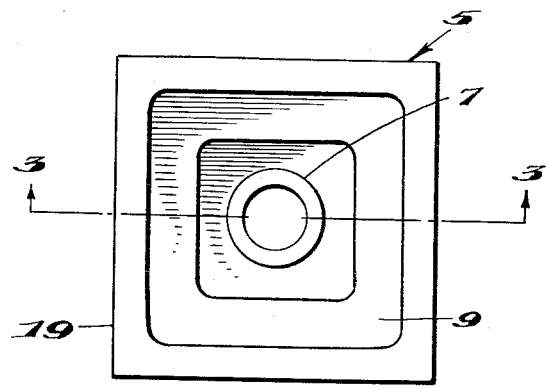
Figure 3:
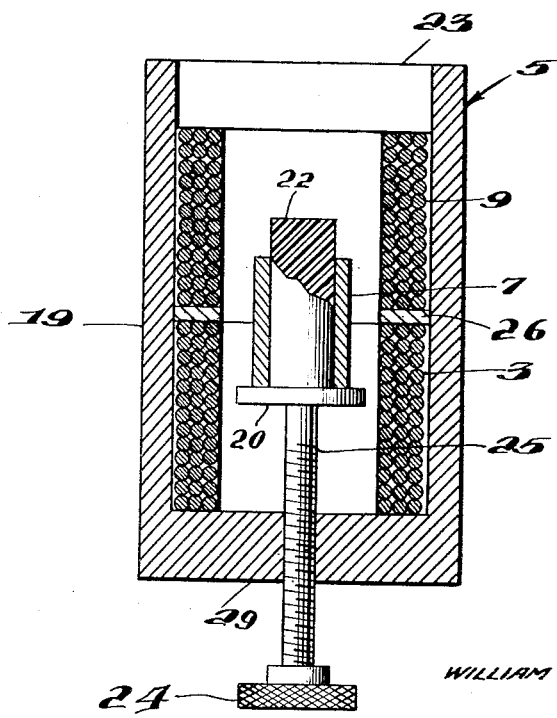

This preferred embodiment of the invention is illustrated in the accompanying drawings in which:

FIG. 1 is a block diagram of the system;
FIG. 2 is a plan view of the detection transformer unit used in the system described;
FIG. 3 is a sectional view of the transformer unit taken in elevation along the lines 3—3 of FIG. 2; and
FIG. 4 is a schematic diagram of the circuitry embodied in the system of the present invention.

Referring now to FIG. 1, the audio frequency source is generally indicated by the numeral 1. This source is used to energize the primary winding 3 of a detection transformer 5. A magnetic core specimen 7 which is to be tested is positioned so that it intercepts substantially all of the flux between primary coil 3 and secondary coil 9 of the detection transformer 5.

The physical principle here utilized is based upon the fact that when a shorted turn conductor is inserted in the magnetic path coupling the primary and secondary circuits of a transformer, the coupling path is broken and no lines of force can intercept the secondary to induce a secondary voltage. Under ideal conditions, this means that if a perfect magnetic core specimen having no resistance were inserted in the detection transformer, there would be no output from the secondary winding 9. In practice, this does not hold true because the core specimens obviously have resistance, and furthermore, they cannot be positioned to intercept all of the flux between the coils. There is also the problem of stray or leakage inductance existing between the primary and secondary windings. What actually happens is that the secondary winding of the transformer develops an output voltage which varies in magnitude between limits determined by (1) the differential loop resistance of a homogeneous standard core used as a reference and (2) an axially flawed core which contains a complete break in the physical loop structure. The secondary voltage induced is approximately a linear function of the loop resistance of the core specimen under test, and since an axial flaw represents an appreciable increase in loop resistance, a readily detectable change in amplitude of the secondary output voltage is obtained.

The output of the secondary winding 9 is fed into an isolation and calibration stage 11, and the output of this stage is fed into one input of a voltage comparator stage 13. A reference signal from the audio frequency source is fed into a second input of the voltage comparator stage 13, and the output of this comparator is an indication of the amplitude difference between the signals from the transformer secondary and the audio frequency source. An amplifier and rectifier stage 15 rectifies the output of the voltage comparator 13, and a D.C. amplifier 17 is used to raise the level of the signal sufficiently to operate a plate relay 19 which actuates the control device 21. The control device 21 may be an indicator only, if manual operation is desired, but in practice it is preferably an automatic mechanism which is appropriately designed and connected to reject automatically any defective core specimens under test.

The structure of the detection transformer 5 may be understood more easily from FIGS. 2 and 3, which are top and elevation views, respectively. The transformer comprises a tubular case 19 of magnetic material having one end 29 closed, and the other end 23 open. Threadedly mounted in end 29 is a movable guidepost member 25, which is made of non-magnetic material and which is located along the tube axis of the transformer case 19. The guidepost member 25 has a flange 20 and enlarged end portion 22, also constructed of non-magnetic material, to facilitate the mounting of the magnetic core specimen 7. A knurled positioning knob 24 is provided on one end of guidepost member 25 to enable rotation and longitudinal adjustment. The core specimens may be inserted and removed manually, or preferably, an automatic mechanism 21 of conventional nature, which is not specifically illustrated, may be used to position and withdraw the core specimens under test. Such automatic mechanism would be operated by the D.C. amplifier circuity which is subsequently described in detail.

Primary winding 3 and secondary winding 9 are coaxially mounted within the case in superposed relationship. A separator 26 of magnetic material is located between the windings 3 and 9 to reduce the magnetic coupling. Because of the positions of the coil windings and the fact that the separator 26 and closely fitting case 19 are made of magnetic material, stray or leakage flux is kept at a minimum.

The detailed operation of the circuitry will now be described by making reference to FIG. 4, which is a schematic diagram of the circuit. As previously explained, the circuit depends for its operation upon the amplitude variation introduced into the output voltage of the secondary winding 9 by a defective core specimen. It is, of course, necessary to calibrate the circuit initially with a standard or reference core specimen so that no phase shift is present at the voltage comparator 13 under standard conditions, and the two inputs thereto are equal in amplitude.

When a standard magnetic core is placed in detection transformer 5, the output voltage of secondary winding 9 measured between terminal 33 and ground will not, in all probability, be equal either in magnitude or phase to the voltage from source 1 measured between terminal 35 and ground. The magnitude of the voltage from secondary winding 9 may be adjusted over a 5 to 1 ratio by means of a variable R-C attenuation network comprising a .001 microfarad capacitor 37 and a 500K ohm potentiometer 39.

The R-C attenuation network is coupled directly to the input of tube 12 which is a cathode follower isolation stage. It is critically important that the voltage comparator 13 present no loading on the detection transformer secondary winding 9; therefore, the input configuration of the cathode follower stage is designed for the maximum possible input impedance. The values of the components in the grid and cathode circuits of cathode follows 12 are as follows:

R41=500K ohms
R45=1 megohm
R49=2.2K ohms
R51=62K ohms
C43=.02 microfarad
C47=50 microfarads at 25 volts D.C.

The signal appearing at terminal 53 of cathode follower 12 is fed through a phase shift network comprising a 100 micromicrofarad condenser 55 and 500K ohm potentiometer 57. The phase of the signal thus appearing on grid lead 59 of voltage comparator tube 14 can be adjusted in a continuously variable fashion over a range of approximately 45 degrees which is sufficient for the purpose of calibration.

The audio frequency source 1 is also impressed across a 10K ohm potentiometer 61, the movable tap of which is connected to cathode lead 63 of the voltage comparator tube 14. By means of potentiometer 61, the magnitude of the input voltage to cathode lead 63 may be adjusted.

From the preceding description of the circuitry, it will be seen that when a standard magnetic core is placed in the detection transformer 5 for calibration, the signals appearing at inputs 59 and 63 of voltage comparator tube 14 may be adjusted to coincide in both magnitude and phase. The magnitude of the signal from the audio reference source 1 which appears at the cathode lead 63 may be adjusted by means of potentiometer 61. The magnitude of the signal appearing at the grid input 59 is adjusted by means of potentiometer 39, while the phase of this signal is adjusted by means of varying potentiometer 57. Since both potentiometers 39 and 57 are part of R-C networks, it will be understood that their actions are not exclusively attenuation and phase shifting respectively, but they are spoken of in distinct capacities for simplicity of explanation.

After the signal inputs appearing on leads 59 and 63 of the voltage comparator tube 14 are balanced to be identical both in magnitude and phase, the output appearing across the 1 megohm resistor 65 will be zero. Any difference in amplitude between the signals appearing at inputs 59 and 63, such as caused by defective core specimens, will produce an output which is proportional to the amplitude difference. This output is amplified by a standard class $A_1$ voltage amplifier 67 which increases the unbalance signal level to a sufficient amplitude for actuating the automatic reject circuitry. The output of amplifier 67 is rectified by tube 16 which produces a positive D.C. control voltage for the D.C. amplifier tube 18. The plate circuit of D.C. amplifier 18 contains a relay 19 which operates the automatic reject circuitry and mechanism. This circuitry may be of conventional nature and is not illustrated. The operating point of plate relay 19 may be adjusted by means of a 10K ohm potentiometer 68 in the cathode circuit of D.C. amplifier 17.

A high pass filter network comprising a 1 megohm resistor 69 and a .25 microfarad capacitor 71 is located in the cathode circuit of rectifier 15. This network is used to smooth out any long term transients which appear in the form of voltage overshoots caused by rapid insertion or removal of core specimens in the detection transformer 5.

The values of the remaining circuit parameters shown in FIG. 4 are as follows:

R73=22K ohms
R75=33K ohms
R77=56K ohms
R79=470 ohms
R81=10 megohms
R83=1.8 megohms
C85=.006 microfarad
C87=.01 microfarad
C89=50 microfarads at 25 volts D.C.
C91=50 microfarads at 50 volts D.C.

The specific values of the circuit components have been given by way of illustrating a practical embodiment of the invention, and are not intended to limit in any way the invention concept herein disclosed.

The audio frequency source 1 used to energize this circuit may be any standard audio generator capable of yielding an output of approximately 51.5 volts R.M.S. at a frequency of 3,750 cycles per second. Detection transformer 5 has a turns ratio of 2:1 with a primary winding 3 of 768 millihenries inductance. The cathode follower 12 and voltage comparator 14 as well as the class $A_1$ voltage amplifier 67 and rectifier 16 are sections of conventional 12AU7 dual triode vacuum tubes. The D.C. amplifier 17 includes a conventional 6J5 triode.

It will be seen from the foregoing description that the device of the present invention provides a unique method for testing magnetic core specimens which produces no deleterious effects either upon the physical or the magnetic properties of the core.

While the invention has been illustrated and described in one embodiment, it is recognized that variations and changes may be made therein without departing from the invention as set forth in the claims.

What is claimed is:

1. In a magnetic core testing device the combination comprising a detection transformer having input and output coils, means for mounting a core specimen under test in movable linking relationship to said coils, a signal source for energizing said detection transformer, first means for comparing the amplitudes of the signal input and output of said detection transformer, and second means controlled by said first means for indicating when a predetermined difference in amplitude exists between the input and output of said detection transformer to determine the relative loop resistance of said core.

2. The combination according to claim 1 wherein said first means comprises a vacuum tube having signal inputs to the grid and cathode elements.

3. In a magnetic core testing device the combination comprising a detection transformer having primary and secondary coils, means for movably mounting a core specimen under test in the magnetic flux path between said coils, an audio frequency signal source connected to said primary coil, means connecting said secondary coil to a first input of an amplitude comparison device, means connecting said signal source to a second input of said amplitude comparison device, and control means actuated by said comparison device for rejecting the core specimen under test when a predetermined difference in amplitude exists between the first and second inputs of said comparison device.

4. The combination according to claim 3 wherein said amplitude comparison device comprises a vacuum tube having grid and cathode inputs to receive the signals from said secondary coil and said audio signal source.

5. In a magnetic core testing device the combination comprising a detection transformer having coaxially mounted primary and secondary coils with hollow core structures, means for positioning a magnetic core specimen under test within the hollow core structures of said coils and in the magnetic flux path between said coils, an audio frequency signal source connected to said primary coil, an amplitude comparator having first and second inputs and an output, first means connecting said secondary coil to the first input of said comparator, second means connecting said signal source to the second input of said comparator, means for rectifying the ouput from said comparator, and control means actuated by the rectified output of said comparator for rejecting the magnetic core specimen under test.

6. The combination according to claim 5 wherein said first means includes a cathode follower stage for effectively isolating said secondary coil from said comparator.

7. The combination according to claim 6 wherein said first means further includes an attenuator and a phase shift network for adjusting the magnitude and phase of the signal appearing at the first input of said comparator.

8. The combination according to claim 5 wherein said second means includes a voltage divider for adjusting the magnitude of the signal appearing at the second input of said comparator.

9. The combination according to claim 5 wherein a high pass filter is provided to remove any long term transients from the rectified output which actuates said control means.

10. In a magnetic core testing device the combination of a detection transformer comprising a tubular case having one closed and one open end, coaxially mounted primary and secondary coils disposed within said case, a guidepost member centrally mounted within said case, means for movably positioning magnetic core test specimens along the axis of said transformer from said open end, a signal source connected to said primary coil, means connecting said secondary coil to a first input of an amplitude comparison device, means connecting said signal source to a second input of said amplitude comparison device, and means for indicating when a predetermined difference in amplitude exists between the first and second inputs of said amplitude comparison device.

References Cited in the file of this patent
UNITED STATES PATENTS

| | | |
|---|---|---|
| 2,318,923 | Clark | May 11, 1943 |
| 2,594,947 | Lynch | Apr. 29, 1952 |
| 2,842,147 | Markson | July 8, 1958 |
| 2,875,419 | Lear | Feb. 24, 1959 |
| 2,888,641 | Lord | May 26, 1959 |
| 2,918,621 | Callan et al. | Dec. 22, 1959 |
| 2,970,690 | Werner | Feb. 7, 1961 |